(No Model.) 2 Sheets—Sheet 1.

C. H. PARMENTER & G. V. BLACKMAN.
FILTER.

No. 407,112. Patented July 16, 1889.

Witnesses,
Geo. H. Strong.
J. H. Norris

Inventor,
Charles H. Parmenter
George V. Blackman
By Dewey & Co.
Att's (No Model.) 2 Sheets—Sheet 2.

C. H. PARMENTER & G. V. BLACKMAN.
FILTER.

No. 407,112. Patented July 16, 1889.

UNITED STATES PATENT OFFICE.

CHARLES H. PARMENTER AND GEORGE V. BLACKMAN, OF OAKLAND, CALIFORNIA.

FILTER.

SPECIFICATION forming part of Letters Patent No. 407,112, dated July 16, 1889.

Application filed February 14, 1889. Serial No. 299,876. (No model.)

*To all whom it may concern:*

Be it known that we, CHARLES H. PARMENTER and GEORGE V. BLACKMAN, of the city of Oakland, county of Alameda, and State of California, have invented an Improvement in Filters; and we hereby declare the following to be a full, clear, and exact description thereof.

Our invention relates to the class of filters; and our invention consists in the constructions and combinations of devices, which we shall hereinafter fully describe and claim.

The object of our invention is to provide a simple and effective filter which is adapted to be readily applied, and can be easily and thoroughly cleaned and its filtering portion renewed.

Figure 1:
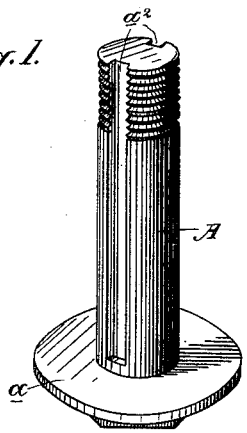
Figure 2:
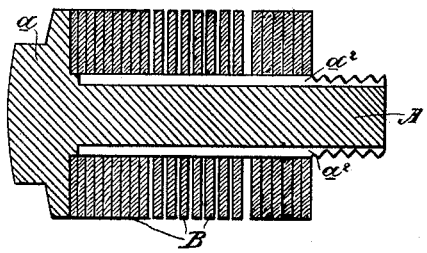
Figure 3:
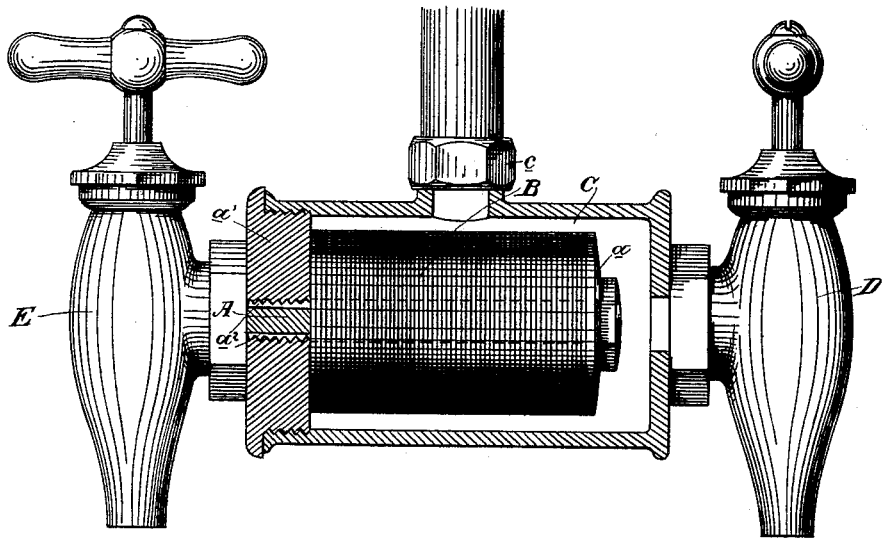
Figure 4:
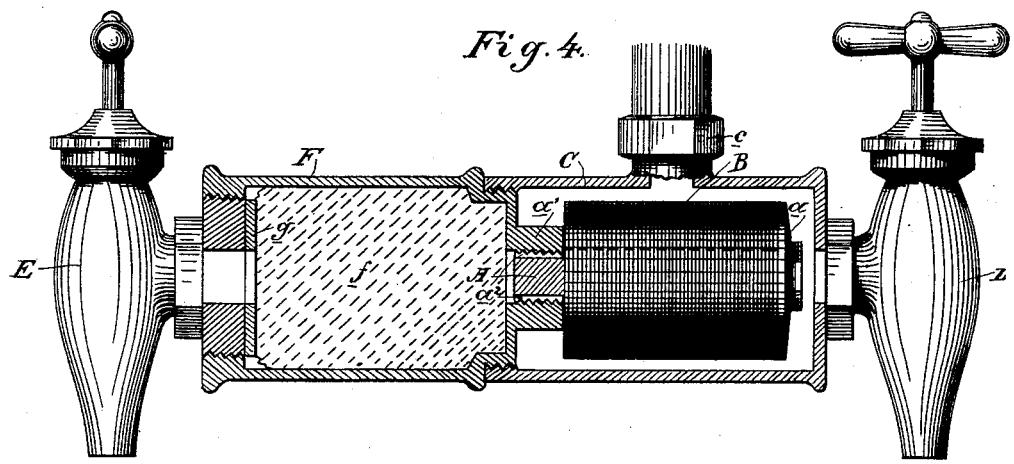
Figure 5:
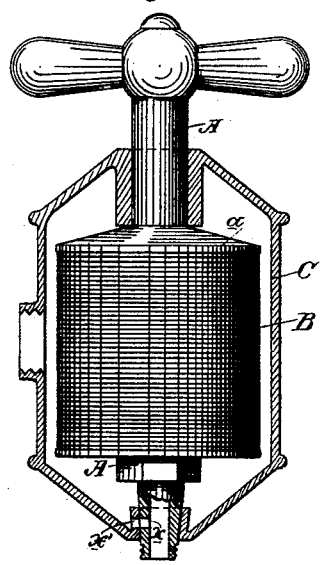

Referring to the accompanying drawings, Figure 1 is a view of the grooved or channeled bolt. Fig. 2 is a longitudinal section of the bolt with the filter-disks applied, some of the disks being separated sufficiently to show their independence of each other, it being understood that in practice they are pressed tightly together. Fig. 3 is a longitudinal section of our complete filter. Fig. 4 is a longitudinal section showing the application to the filter of a purifying attachment. Fig. 5 is a section showing our invention in the form of a filter-faucet.

A, Fig. 1, is a bolt or bar, having at one end a fixed collar $a$, and threaded at its other end for a nut. In the sides of the bolt or bar are made the grooves or channels $a^2$, which commence near the collar $a$ and extend through to the end of the bolt or bar. Around the bolt or bar are fitted a number of independent disks B, Fig. 2, of cloth or other suitable filtering fabric or material. These are tightened up by a nut between them and the collar $a$ to form a practically-solid mass. The degree of pressure applied determines the effectiveness of the filtering and the amount of flow. If set up to the highest degree the best result is attained as far as filtering is concerned, though the flow is retarded, which, however, can be increased by loosening the nut slightly; but it will be seen that power enough can be exerted to press the disks so closely together as to form a very effective compact filtering medium for the water, and we have found by practice that a good result is obtainable. The bolt A being channeled or grooved is not materially weakened, and its discharging capacity may be increased as desired by increasing the grooves or channels.

In Fig. 3 we show the construction and arrangement complete. Filter C is a casing having a coupling at $c$ for connecting it to the water-pipe or to a faucet of said pipe. Within this casing C the grooved bolt A, with its disks B, is fitted. At one end of the casing a faucet D is connected, and at the other end is a faucet E, this latter faucet carrying the nut $a'$, which screws upon the threaded end of the bolt and presses the disks B together. The faucet E does not communicate with the casing C, but only with the grooves or channels $a^2$ of the bolt A, while the other faucet communicates only with the casing C. When filtered water is desired, the faucet D is closed and the faucet E is opened.

The water passing into casing C forces its way through and between the closely-packed disks B, and into the grooves or channels $a^2$ of bolt A, thence through said grooves or channels, and out through faucet E. In its passage the sediment and impurities are arrested by the disks B, leaving the escaping water pure. Now, by closing faucet E and opening faucet D, the incoming water washes off and cleanses the disks B, and passes out through faucet D, so that every time faucet D is opened the filter is cleaned out; and this cleaning is the more perfectly effected by reason of the comparatively close casing C around the disks B, which confines the water and thus utilizes its full head or pressure to act in cleansing the disks; but if it be necessary or desirable to clean the disks B more thoroughly or to renew them the bolt A and disks may readily be taken out by unscrewing the faucets.

In Fig. 4 we show a purifier attachment, which, if desired, may be used to form a thoroughly-effective device. A cylinder F takes the place of the faucet E. This cylinder carries the nut $a'$, and is screwed both into the end of the casing C and upon the end of the grooved or channeled bolt, though it does not communicate with the casing, but only with the grooves or channels of bolt A.

The cylinder F contains some filtering or purifying material $f$—such as animal charcoal. In the other end of this cylinder is screwed the faucet E, the base-flange of which presses, through the intervention of a washer $g$, upon the charcoal, and by its pressure gives said charcoal the required compactness or density. The filtered water which passes through the disks B and the grooves of bolt A flows thence into cylinder F and through the charcoal therein, passing out through the faucet E. This way of compressing the charcoal we find very effective, besides being convenient for its removal and renewal.

In Fig. 5 we show our invention in the modified form of a faucet. In this the grooved bolt A is the ordinary rotary spigot, and carries the disks B. It is inclosed in the faucet-pipe corresponding to casing C. The grooves of the bolt open directly through the lower end, but the base of the casing communicates with the lower end of the bolt only when a hole $x$ in its lower end is brought into line with an opening $x'$ in the casing. Thus when the hole and opening are out of line the water must pass through the disks and grooves and be filtered; but when they are brought into line the water passes directly out and cleans the disks, as before.

Having thus described our invention, what we claim as new, and desire to secure by Letters Patent, is—

1. In a filter, a bolt or bar having grooves or channels in its sides and provided with a number of independent disks of cloth or other filtering material encircling it around its grooves or channels and pressed closely together, in combination with an encircling casing connected with the water-supply, a faucet connected with said casing, and a faucet having a nut $a$, connected with the threaded end of said bolt or bar and communicating with its grooves or channels, substantially as described, 2. In a filter, a bolt or bar having openings in its sides and provided with a number of independent disks of cloth or other filtering material encircling it around its grooves or channels and pressed closely together, in combination with an encircling casing connected with the water-supply, a faucet connected with said casing, a cylinder communicating with the grooves or channels of the bolt or bar and containing purifying material, and a faucet connected with said cylinder, substantially as described.

3. In a filter, the bolt or bar having grooves or channels in its sides and provided with a number of independent disks of cloth or other filtering material encircling it around its grooves or channels and pressed closely together, in combination with an encircling casing connected with the water-supply, a faucet connected with said casing, a cylinder communicating with the grooves or channels of the bolt or bar and containing purifying material, a faucet connected with said cylinder and having a flanged base screwing therein, and a washer in the cylinder pressed upon by the flanged base of the faucet for compressing the purifying material, substantially as described.

In witness whereof we have hereunto set our hands.

CHARLES H. PARMENTER.
GEORGE V. BLACKMAN.

Witnesses.
KIRK KINNEY,
J. H. BLOOD.